United States Patent
Weng et al.

(10) Patent No.: US 8,350,551 B2
(45) Date of Patent: Jan. 8, 2013

(54) POWER-SUPPLY CONTROLLER

(75) Inventors: Da Feng Weng, Sunnyvale, CA (US);
Jinrong Qian, Plano, TX (US); Tamas Szepesi, Saratoga, CA (US)

(73) Assignee: Intersil Americas LLC, Milpitas, CA (US)

( * ) Notice: Subject to any disclaimer, the term of this patent is extended or adjusted under 35 U.S.C. 154(b) by 328 days.

(21) Appl. No.: 12/826,577

(22) Filed: Jun. 29, 2010

(65) Prior Publication Data
US 2010/0264895 A1    Oct. 21, 2010

Related U.S. Application Data

(63) Continuation-in-part of application No. 12/254,525, filed on Oct. 20, 2008, now abandoned, which is a continuation of application No. 11/443,838, filed on May 30, 2006, now Pat. No. 7,439,721.

(60) Provisional application No. 60/687,165, filed on Jun. 3, 2005.

(51) Int. Cl.
*G05F 1/00* (2006.01)
(52) U.S. Cl. .................. 323/284; 323/224
(58) Field of Classification Search .............. 323/224, 323/283, 284, 285
See application file for complete search history.

(56) References Cited

U.S. PATENT DOCUMENTS

| | | | |
|---|---|---|---|
| 6,181,120 B1 | 1/2001 | Hawkes et al. | |
| 6,492,794 B2 | 12/2002 | Hwang | |
| 6,495,995 B2 | 12/2002 | Groom et al. | |
| 6,583,610 B2 | 6/2003 | Groom et al. | |
| 7,045,993 B1 * | 5/2006 | Tomiyoshi | 323/224 |
| 7,439,721 B2 | 10/2008 | Weng et al. | |
| 2003/0142519 A1 | 7/2003 | Walters et al. | |
| 2005/0007087 A1 | 1/2005 | Pullen et al. | |
| 2005/0258814 A1 | 11/2005 | Chen et al. | |
| 2009/0102447 A1 | 4/2009 | Weng et al. | |

OTHER PUBLICATIONS

Integrated XScale Regulator Data Sheet ISL6271A, FN9171.1, Intersil Americas Inc., 2004, pp. 16.
Quick-PWM Step-Down Controllers with Inductor Saturation Protection and Dynamic Output Voltages, MAX1992/MAX1993, Maxim Integrated Products, 2002, pp. 36.
5-Bit, 2 Phase Synchronous Buck Controller with 2 LDOs, AQ9220, Argues Technology, 2003, pp. 37.

(Continued)

*Primary Examiner* — Shawn Riley
(74) *Attorney, Agent, or Firm* — Paul A. Bernkopf; Graybeal Jackson LLP; Bryan A. Santarelli

(57) ABSTRACT

An embodiment of a power-supply controller includes a signal combiner and a control circuit. The signal combiner is operable to generate a combined feedback signal from sense and output feedback signals that are respectively derived from a sense signal and a regulated output signal, and the signal combiner is operable to receive the sense signal from a sense circuit that is operable to generate the sense signal while a current is flowing through an inductor and while a switch that is disposed between the inductor and an input voltage has a first state. The sense signal generated by the sense circuit is related to the current, and the switch and the inductor are operable to generate the regulated output signal. The control circuit is coupled to the signal combiner and is operable to cause the switch to have a second state for a predetermined time in response to the combined feedback signal having a predetermined relationship to a reference signal.

50 Claims, 9 Drawing Sheets

OTHER PUBLICATIONS

Dual-Output Voltage Regulator for DDR SDRAM, AQ9260, Argues Technology, 2004, pp. 28.

High-Speed Step-Down Controller for Notebook Computers, MAX1714, Maxim Integrated Products, 1999, pp. 24.

Integrated DDR Power-Supply Solutions for Desktops, Notebooks, and Graphic Cards, MAX8550/MAX8551, Feb. 2004, pp. 29.

Geyserville-Enabled DC-DC Converter Controller for Mobile CPUs, ADP3421, Analog Devices, Inc., 2002, pp. 12.

3-Phase IMVP-II and IMVP-III Core Controller for Mobile CPUs, ADP3204*, Analog Devices, Inc., 2002, pp. 16.

4MHz, 500mA Synchronous Step-Down DC-DC Converters in Thin SOT and TDFN, MAX8560/MAX8561/MAX8562, 19-2954; Rev 2; Aug. 2005, pp. 12.

* cited by examiner

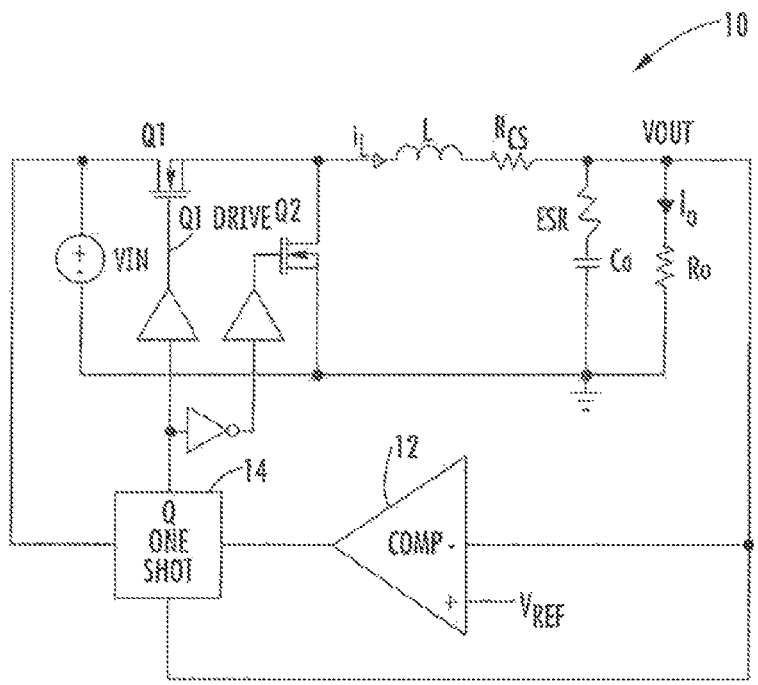
FIG. 1
(PRIOR ART)
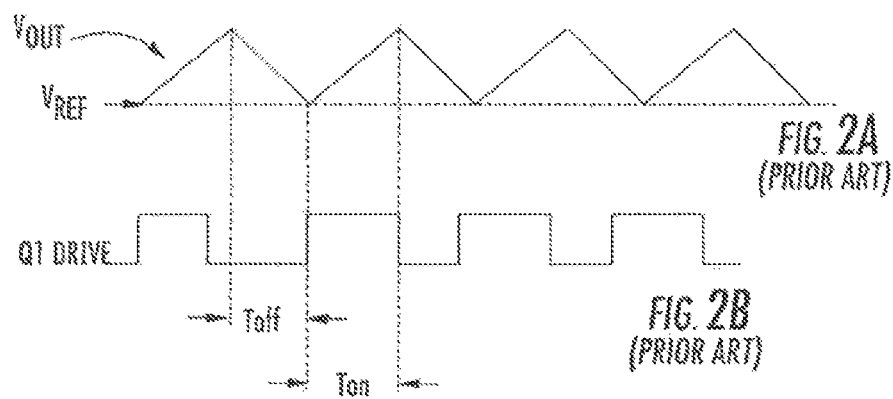
FIG. 2A
(PRIOR ART)
FIG. 2B
(PRIOR ART)

POWER-SUPPLY CONTROLLER

CLAIM OF PRIORITY

The present application is a continuation in-part of co-pending U.S. patent application Ser. No. 12/254,525, filed Oct. 20, 2008, currently pending; which is a continuation of U.S. patent application Ser. No. 11/443,838, filed May 30, 2006, now U.S. Pat. No. 7,439,721, issued Oct. 21, 2008; which claims the benefit of U.S. Provisional application Ser. No. 60/687,165, filed on Jun. 3, 2005, all of the foregoing applications are incorporated by reference herein in their entireties.

BACKGROUND

A traditional constant-on-time buck-converter regulates an output voltage by using the ripple on the output voltage as a PWM ramp signal to control the turn-on instant of the transistor that couples the input voltage to the filter inductor.

A constant-on-time buck converter may have a number of advantages over other types of power supplies. For example, a constant-on-time buck converter typically operates at a constant-frequency for steady-state loads, has high efficiency over a wide load range, requires few, if any, additional compensation components, and responds quickly to changes in the load. Furthermore, such a buck converter may transition relatively seamlessly between a pulse-width modulation mode (normal load conditions where the switching frequency is relatively constant) and a pulse-frequency modulation mode (heavy or light load conditions where the switching frequency increases or decreases, respectively).

FIG. 1 is a schematic diagram of a traditional constant-on time buck converter, i.e., power supply, 10, and FIGS. 2A and 2B are respective plots of the voltages VOUT, Vref, and Q1$_{drive}$ of FIG. 1.

Referring to FIGS. 1-2B, the operation of the power supply 10 is described.

During a discharge time Toff, the transistor Q1 is deactivated and the transistor Q2 is activated such that the decaying current I$_L$ flowing through the inductor L also flows through the closed transistor Q2. As I$_L$ decays, VOUT ramps downward toward Vref as shown in FIG. 2A.

When VOUT ramps below Vref, a comparator 12 activates a one shot 14, which activates Q1 and deactivates Q2 for a predetermined "constant-on" or charge time Ton. During the charge time Ton, an increasing current I$_L$ flows from the input voltage Vin, through the transistor Q1 and the inductor L, to the filter capacitor Co and load Ro. As I$_L$ increases, VOUT ramps upward as shown in FIG. 2.

After the elapse of the predetermined charge time Ton, the one shot 14 deactivates Q1 and activates Q2 and the above-described cycle repeats.

There are two components to the ripple on VOUT.

The first component is the in-phase component, which is the voltage generated by current flowing through the equivalent series resistance (ESR) of the output filter capacitor Co. The in-phase component is in phase with the inductor current I$_L$, because the voltage across a resistor is in phase with the current through a resistor.

The second component is the out-of-phase component, which is generated by the charging and discharging of the output filter capacitor Co. The out-of-phase component is out of phase with the inductor current I$_L$, because the phase of the voltage across a capacitor lags the phase of the current through the capacitor (the current through the capacitor is in phase with the current trough the inductor L).

Therefore, as discussed below, the value of the ESR affects the stability of the feedback loop of the power supply 10.

Generally, the loop is stable where $f_{ESR} \leq f_{SW}/\pi$, where $f_{SW} = 1/(Ton+Toff)$ (the switching frequency), and $f_{ESR} = 1/(2\pi \cdot ESR \cdot Co)$.

Consequently, as long as both the ESR and output filter capacitor Co are relatively large (e.g., ESR≦40 milliohms (mΩ)), then the in-phase component of the ripple on VOUT is the dominant component, and thus the phase shift of the ripple relative to the inductor current I$_L$ is relatively small. That is, the in-phase component of the ripple caused by the portion of I$_L$ that flows through the ESR "swamps out" the out-of-phase component of the ripple.

Therefore, a traditional constant-on-time power supply includes an output filter capacitor Co having an ESR that is large enough to provide a stable feedback loop.

Recently, filter capacitors having ESR values of 5 mΩ or less have become available; it is sometimes desirable to use such a low-ESR filter capacitor in a buck-converter power supply with a relatively high steady-state switching frequency to reduce the size and cost of the converter.

Unfortunately, using such a low-ESR capacitor may render a traditional constant-on-time power supply unstable. An unstable power supply may have too large of a voltage tolerance, VT, as described below in conjunction with FIG. 3, or may oscillate.

FIG. 3 is a plot of VOUT of FIG. 1 simulated for a 13 Ampere (A) step increase in the load current Io followed by a 13 A step decrease in Io, where VIN=10 Volt (V), Vref=1.76 V, L=1 microhenry (µH), Co=800 microfarads (µF), ESR=0, and $f_{sw} \approx 300$ kilohertz (kH). The low value of ESR decreases the stability margin of the feedback loop, and thus causes transient "ringing" on VOUT in response to the step change in Io. Typically, a customer specifies the maximum voltage tolerance VT, which is the difference between the maximum droop of VOUT in response to a step increase in the load current Io and the maximum peak of VOUT in response to a step decrease in Io. In this example, the transient "ringing" on VOUT results in a VT of approximately 70 millivolts (mV). Because VT is inversely proportional to the value of the output filter capacitor Co, one typically chooses a value of Co large enough to provide the specified value of VT.

Some integrated-circuit (IC) manufacturers have developed constant-on-time topologies that allow the use of a low-ESR filter capacitor. But unfortunately, these topologies may require additional feedback, additional compensation circuitry, and that the power-supply controller chip have an additional pin, and may yield a relatively poor regulation of VOUT.

An analysis similar to that above may be made for constant-off-time power supplies and other types of power supplies, such as boost and buck-boost, the stabilities of which rely on the filter capacitor ESR.

SUMMARY

An embodiment of a power-supply controller includes a signal combiner and a control circuit. The signal combiner is operable to generate a combined feedback signal from sense and output feedback signals that are respectively derived from a sense signal and a regulated output signal, and the signal combiner is operable to receive the sense signal from a sense circuit that is operable to generate the sense signal while a current is flowing through an inductor and while a switch (for example, a transistor) that is coupled between the inductor and a first input-voltage node has a first state. The sense signal generated by the sense circuit is related to the current, and the switch and inductor are operable to cooperate to generate the regulated output signal. The control circuit is coupled to the signal combiner and is operable to cause the switch to have a second state for a predetermined time in response to the combined feedback signal having a predetermined relationship to a reference signal.

For example, such a power-supply controller may yield a relatively tight and stable regulation of an output voltage generated by a power supply (e.g., constant-on time, constant-off time, boost, or buck-boost) that includes a low-ESR filter capacitor, with no additional compensation components and with no additional pin on the power-supply-controller chip.

BRIEF DESCRIPTION OF THE DRAWINGS

Features and advantages of one or more embodiments may best be understood by making reference to the following non-limiting description taken in conjunction with the accompanying drawings, in the several figures of which like references identify like elements.

FIG. 1 is a schematic diagram of a traditional constant-on time power supply.

FIGS. 2A-2B are respective plots of some of the voltages of FIG. 1.

DETAILED DESCRIPTION

In the following detailed description of exemplary embodiments, reference is made to the accompanying drawings, which form a part hereof. The detailed description and the drawings illustrate specific exemplary embodiments. It is understood that other embodiments may be utilized, and other changes may be made, without departing from the spirit or scope of the disclosure. The following detailed description is therefore not to be taken in a limiting sense.

Figure 4:
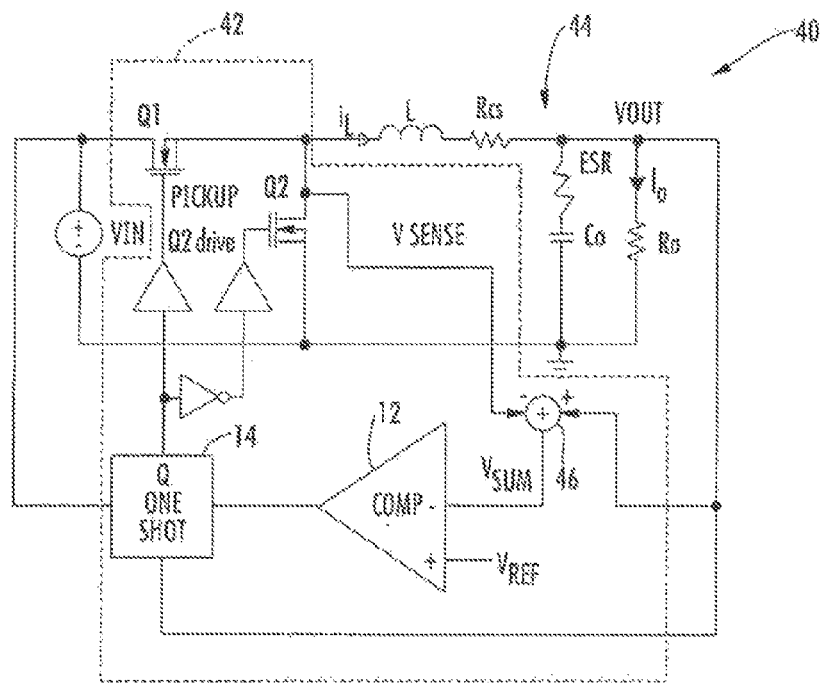
FIG. 4 is a schematic diagram of an embodiment of a constant-on-time power supply.

FIG. 4 is a schematic diagram of an embodiment of a constant-on-time power supply 40. As further described below, the power supply 40 allows the use of a filter capacitor Co with very low ESR, for example as low as approximately 0 mΩ-5 mΩ. Furthermore, the power supply 40 requires no additional pin on the power-supply controller integrated circuit (IC), requires no additional compensation circuitry, and yields a relatively tight regulation of VOUT as compared to prior constant-on-time supplies such as the supply 10 of FIG. 1. Moreover, for a given VT, the supply 40 may allow one to use a smaller filter capacitor Co than prior supplies such as the supply 10.

The supply 40 includes a power-supply controller IC 42 and a filter circuit 44, and provides a regulated output voltage VOUT to a load, which is represented by a resistor Ro.

In addition to the transistors Q1 and Q2, the comparator 12, and the one shot 14, the IC 42 includes a signal combiner, for example an adder 46, which adds an inverse of a sense signal, for example a sense voltage $V_{sense}$, to VOUT, and which provides the resulting combined feedback signal, for example, $V_{sum}$, to an inverting input node of the comparator 12. $V_{sense}$ effectively enhances or replaces the contribution to the feedback signal $V_{sum}$ of the in-phase component of the VOUT ripple generated by ESR, and thus allows the power supply 40 to maintain a tight and stable regulation of VOUT even where ESR is relatively low, or even near 0Ω. Furthermore, because the on resistance Rds(on) of the transistor Q2 generates $V_{sense}$ at the source of Q2, the adder 46 is the only additional circuitry that the IC 42 includes as compared to the power supply 10 of FIG. 1. In addition, because Q2 generates $V_{sense}$ internally, the IC 42 needs no additional pin to receive $V_{sense}$. Moreover, in an alternate embodiment where Q1 and Q2 are disposed external to the IC 42, a current-sense pin (not shown in FIG. 4) of the IC is typically connected to the source of Q2 for current-limiting purposes. Consequently, because the current-sense pin can inherently generate $V_{sense}$, the IC 42 needs no additional pin to receive $V_{sense}$ even in this alternate embodiment. The signal combiner 46 may include scaling, limiting, and sampling functionality relative to either or both of its input signals.

The filter circuit 44 includes the filter inductor L having an equivalent series resistance Rcs, and includes the output filter capacitor Co having a relatively low ESR.

Figure 5A:
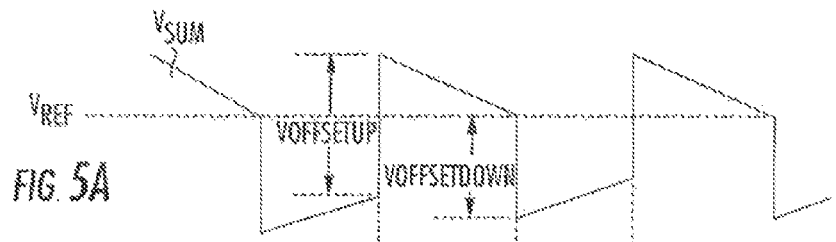
FIGS. 5A-5C are plots of voltages of an embodiment of the power supply of FIG. 4.
Figure 5C:
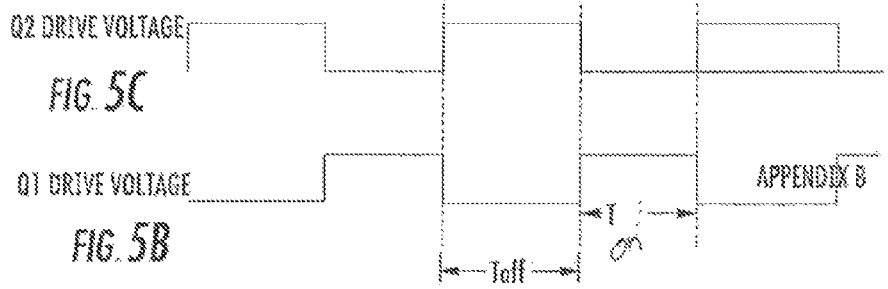
Figure 5B:

FIGS. 5A-5C are respective plots of the voltages $V_{sum}$ and Vref, $Q1_{drive}$, and $Q2_{drive}$ of FIG. 4 according to an embodiment. Although these voltages are shown having an approximately 50% duty cycle, they may have other duty cycles as discussed below.

Referring to FIGS. 4-5C, the operation of the power supply 40 is described according to an embodiment.

During a discharge time Toff, the transistor Q1 is deactivated and the transistor Q2 is activated such that the discharging, i.e., decaying, current $I_L$ flowing through the inductor L also flows through the transistor Q2. As $I_L$ decays, $V_{sum}$ ramps downward toward Vref as shown in FIG. 5A.

When $V_{sum}$ ramps below Vref, the comparator 12 activates the one shot 14, which activates Q1 and deactivates Q2 for a predetermined "constant-on" charging time Ton, the value of which for a steady-state load is Ro given by the following equation:

$$Ton = \frac{K(VOUT) + I_L \cdot Q2_{Rds(on)}}{Vin} \quad (1)$$

where K is a constant that depends on the circuit topology and component values. The dependence of Ton on $I_L \cdot Q2_{Rds(on)}$ allows the switching frequency $f_{sw}$ to be substantially independent of the load current Io within a predetermined range of Io. That is, by changing Ton, and thus the switching duty cycle, the power supply 40 maintains $f_{sw}$ at a substantially constant frequency for a steady-state load Ro. Furthermore, because at the beginning of Ton the voltage $V_{sense}$ changes from a negative to a positive voltage with respect to ground, $V_{sum}$ "jumps" downward by a DC offset voltage $V_{offsetdown}$. The adder 46 may be designed to effectively "ignore" a positive $V_{sense}$ above a certain value by limiting it or by assigning a predetermined value such as 0V to $V_{sense}$ when $V_{sense}$ is positive and above a certain value. For example, one may include a resistor between the drain of Q2 and the inverting input of adder 46 (not shown) and connect a diode (not shown) between the source of Q2 (cathode) and the inverting input of the adder 46 (anode) so that the diode blocks $V_{sense}$ when $V_{sense}$ is more positive than a diode forward voltage (approximately 0.7V). Other conventional topologies for implementing this function are known, and therefore, are not described in detail. Alternatively, the adder 46 may be designed to effectively "ignore" $V_{sense}$ when Q1 is active or when Q2 is inactive by sampling, for example. This (as well as the diode-limiting circuit described above) allows the controller 42 to detect a reverse current through the inductor L (from Co toward transistor Q2), as may occur during light-load in continuous-current mode (CCM) operating mode—such a reverse current causes $V_{sense}$ to be positive while Q2 is active.

During Ton, an increasing current $I_L$ flows from the input voltage Vin, through the transistor Q1 and the inductor L, and to the filter capacitor Co and the load Ro. As $I_L$ increases, VOUT, and thus $V_{sum}$, ramps upward.

After the elapse of the predetermined on time Ton, the one shot 14 deactivates the transistor Q1 and activates the transistor Q2 and the above-described cycle repeats. Because at the end of Ton $V_{sense}$ changes from a positive to a negative voltage, $V_{sum}$ "jumps" upward by a DC offset voltage $V_{offsetup}$. Furthermore, because $I_L$ is at a minimum at the beginning of Ton and at a maximum at the end of Ton, $V_{offsetdown}$ is typically less than $V_{offsetup}$.

Referring to FIG. 4, alternate embodiments of the power supply 40 are contemplated. For example, although the adder 46 is shown inverting $V_{sense}$, the adder may have two noninverting inputs and the supply 40 may include an inverter or other circuitry to invert $V_{sense}$. Furthermore, although $V_{sense}$ and VOUT are described as being voltages, one or both of the sense signal and the regulated output signal may be a current, as may be the combined feedback signal $V_{sum}$. Moreover, the adder 46 may be replaced by a signal combiner that combines $V_{sense}$ and VOUT by other than adding.

Figure 3:
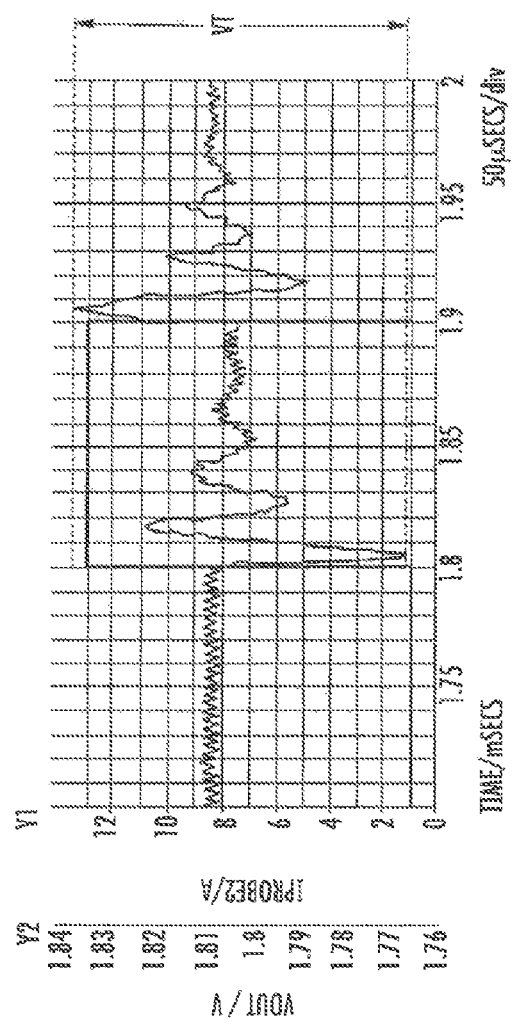
FIG. 3 is a plot of the regulated output voltage of FIG. 1 simulated for a step increase in the load current followed by a step decrease in the load current.
Figure 6:
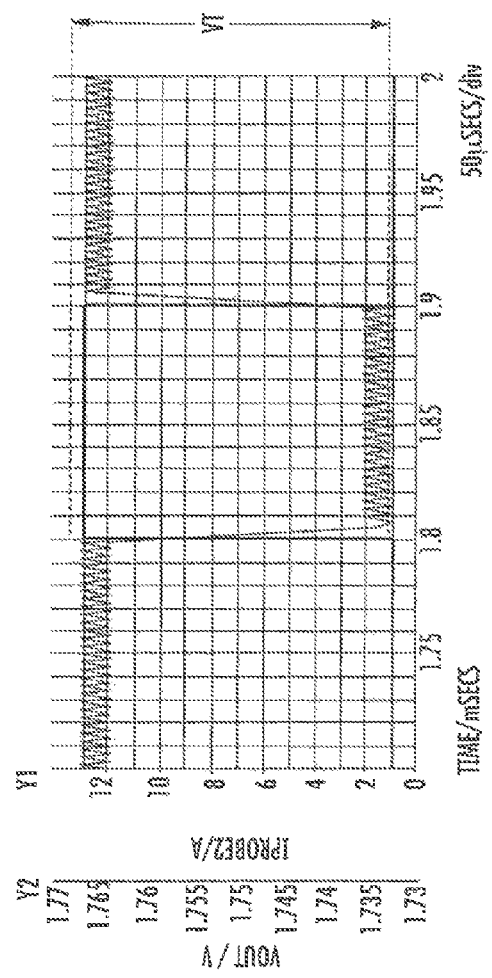
FIG. 6 is a plot of the regulated output voltage of FIG. 4 simulated for a step increase in the load current followed by a step decrease in the load current according to an embodiment.

FIG. 6 is a plot of VOUT of FIG. 4 simulated for a 13 Ampere (A) step increase in the load current Io followed by a 13 A step decrease in Io where Vin=10V, Vref=1.76V, L=1 microhenry (µH), Co=800 microfarads (µF), and ESR=0; these are the same parameters as plotted in FIG. 3 for the power supply 10 of FIG. 1. As compared to the supply 10, the modified topology of the power supply 40 stabilizes the supply so as to virtually eliminate transient "ringing" on VOUT in response to the step changes in the load current, and lowers VT from about 70 mV to about 35 mV. Specifically, generating $V_{sense}$ in phase with the current through the inductor L increases the stability margin of the supply 40, and thus reduces (in this embodiment, virtually eliminates) the transient "ringing" on VOUT in response to the step changes in the load current as compared to the supply 10 of FIG. 3. Furthermore, designing the supply 40 to allow VOUT to change slightly, i.e., "droop," with the load current Io also contributes to the reduction in VT as compared to the supply 10. This "droop" is due, at least in part, to the DC level of $V_{sense}$ changing as the DC level of Io changes. Because there exist conventional techniques for designing power supplies that exhibit "droop," a more detailed discussion of such techniques is omitted.

Consequently, because for the same parameters, the VT of the supply 40 is approximately ½ the VT of the supply 10, if one specifies a VT of 70 mV, then he can reduce the value of Co of the supply 40 to 400 µF, which is half the 800 µF value of Co of the supply 10. That is, using a Co=400 µF in the power supply 10 yields a VT of approximately 70 mV. This reduction in the value of Co may reduce the size and cost of Co as compared to the Co of the supply 10, and thus may reduce the size and cost of the supply 40 as compared to the supply 10.

Referring again to FIG. 4, alternate embodiments of the power supply 40 are contemplated. For example, the supply 40 may be modified to be a constant-off-time supply instead of a constant-on-time supply. Furthermore, the technique of using as feedback a voltage signal across the return transistor Q2, or another signal proportional to the current through Q2, may be used in other types of power supplies, such as boost and buck-boost supplies.

Figure 7:
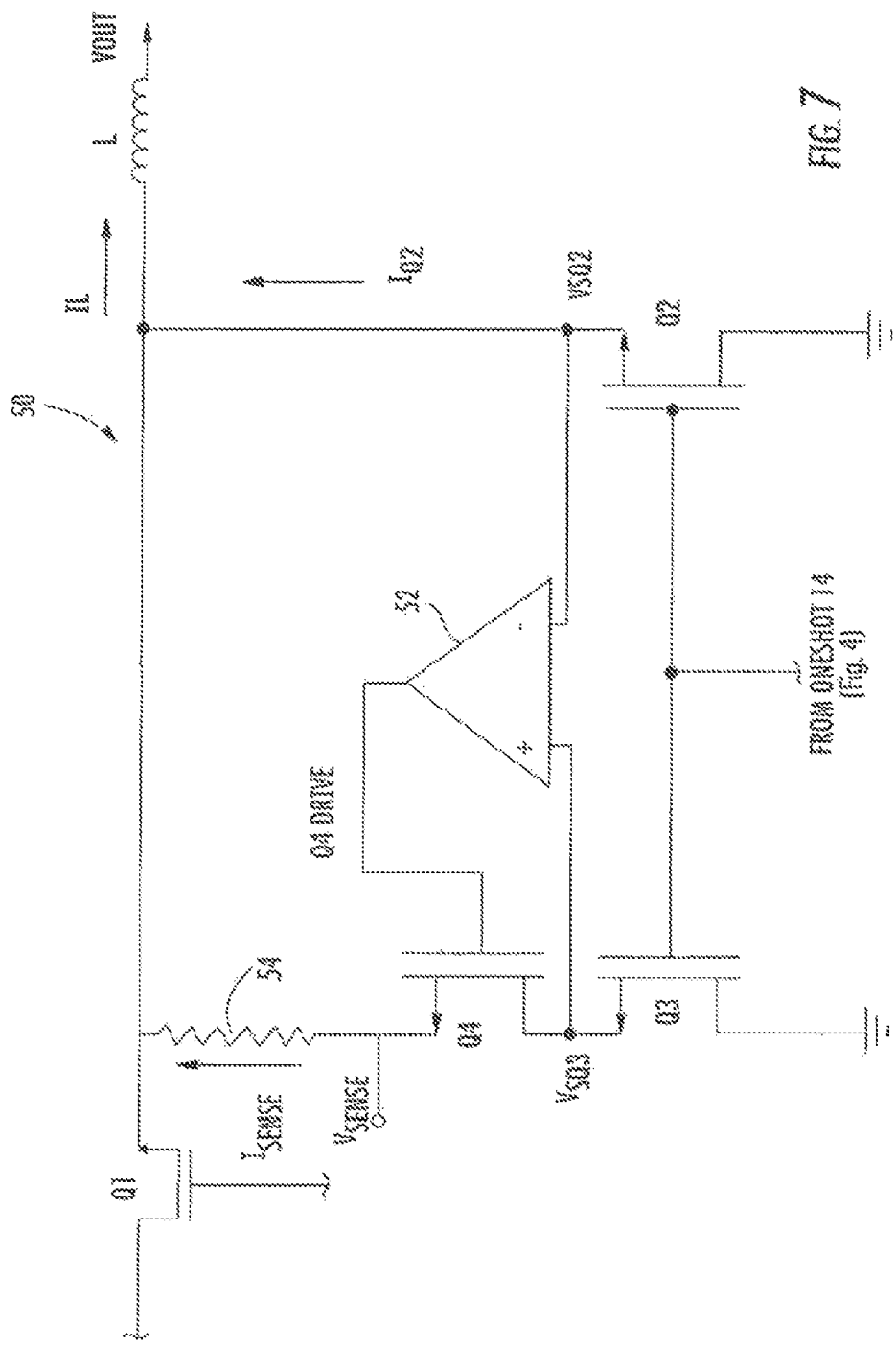
FIG. 7 is a schematic diagram of an embodiment of a temperature-stable circuit that the power supplies of FIGS. 4, 9, and 10 may include to sense the inductor current.

FIG. 7 is a schematic diagram of a sensing circuit 50 and the portion of the power supply 40 of FIG. 1 to which the sensing circuit is connected according to an embodiment. The sensing circuit 50 may be included in the power supply 40 of FIG. 4 to provide a temperature-stable value for $V_{sense}$. That is, the circuit 50 reduces the sensitivity of $V_{sense}$ to temperature as compared to $V_{sense}$ being measured directly across Q2 as shown in FIG. 4. The circuit 50 may be entirely or partially disposed on the IC 42, or may be totally disposed external to the IC 42. However, where the sensing circuit 50 is disposed entirely on the IC 42, the components of the sensing circuit may be more closely matched to each other; therefore, the sensing circuit may provide $V_{sense}$ with a lower temperature sensitivity than where some or all of the components of the sensing circuit are disposed off chip.

In addition to the transistor Q2, the sensing circuit 50 includes transistors Q3 and Q4, a differential amplifier 52, and a resistive sense element 54, here a sense resistor. The transistors Q2 and Q3 have similar dimensions, and the gain G of the amplifier 52 and the value of the sense amplifier 54 are selected such that $I_{sense}/I_{Q2}$ is small, for example ¹⁄₁₀₀₀. Also, the thermal response of Q2 closely matches that of Q3; a sufficient matching of the thermal response typically occurs where Q2 and Q3 are disposed on the same IC.

The operation of the sensing circuit 50 is now described in conjunction with FIGS. 4 and 7 according to an embodiment. For purposes of example, the temperature sensitivity of the sense resistor 54 is ignored, and the gain G of the amplifier and the value of the sense resistor are selected such that $I_{sense}/I_{Q2} \approx 1/1000$.

When the one shot 14 (FIG. 4) deactivates the transistor Q1 and activates the transistor Q2 during the discharge time $T_{off}$ (FIG. 5B), the one shot also activates the transistor Q3.

The amplifier 52 generates an output signal $Q4_{drive}$ that equals $G(Vs_{Q3}-Vs_{Q2})$, where $Vs_{Q3}$ is the voltage at the source of the transistor Q3, and $Vs_{Q2}$ is the voltage at the source of the transistor Q2. Because Q2 and Q3 have similar dimensions and $I_{sense} \ll I_{Q2}$, $Vs_{Q2} < Vs_{Q3}$ for $I_{Q2} > 0$.

The signal $Q4_{drive}$ causes the transistor Q4 to source to the element 54 the current $I_{sense}$, which is proportional to $Vs_{Q3}-Vs_{Q2}$; consequently, $V_{sense}$ is also proportional to $Vs_{Q3}-Vs_{Q2}$. More specifically, because the transistor Q4 acts as a voltage follower, $I_{sense} \approx [G(VS_{Q3}-Vs_{Q2})-Vt]/(\text{sense element } 54)$, where Vt is the threshold voltage of the transistor Q4. Furthermore, because $I_{sense}$ is relatively small, $Vs_{Q3}$ remains relatively constant as compared to $Vs_{Q2}$ such that $I_{sense}$ varies substantially linearly with $Vs_{Q2}$. And because $Vs_{Q2}$ is the voltage across the Rds(on) of Q2, and thus varies substantially linearly with $I_{Q2}$, $I_{sense}$ varies substantially linearly with $I_{Q2}$. Moreover, because $I_{sense} \ll I_{Q2}$, $I_{Q2}$ approximately equals $I_L$ (i.e., $I_{Q2} \approx I_L$); consequently, $I_{sense}$ varies substantially linearly with $I_L$, as is desired in this embodiment.

Because Q2 and Q3 are thermally matched, $Vs_{Q3}$ and $Vs_{Q2}$ shift by substantially the same amount in response to a change in temperature. But even with this temperature-induced shift, the difference between $Vs_{Q3}$ and $Vs_{Q2}$, and thus $Q4_{drive}$, $I_{sense}$, and $V_{sense}$, remain substantially unchanged with temperature for a given $I_L$. Put another way, the similar temperature-induced shifts in $Vs_{Q3}$ and $Vs_{Q2}$ compose a common-mode signal at the input nodes of the differential amplifier 52, which rejects this common-mode signal, thus rendering $V_{sense}$ less sensitive to temperature than if $V_{sense}$ were taken directly across the transistor Q2 as shown in FIG. 4.

Still referring to FIG. 7, alternate embodiments of the sensing circuit 50 are contemplated. For example, the circuit 50 may be modified to work with a constant-off-time supply, a boost supply, or a buck-boost supply.

Figure 8:
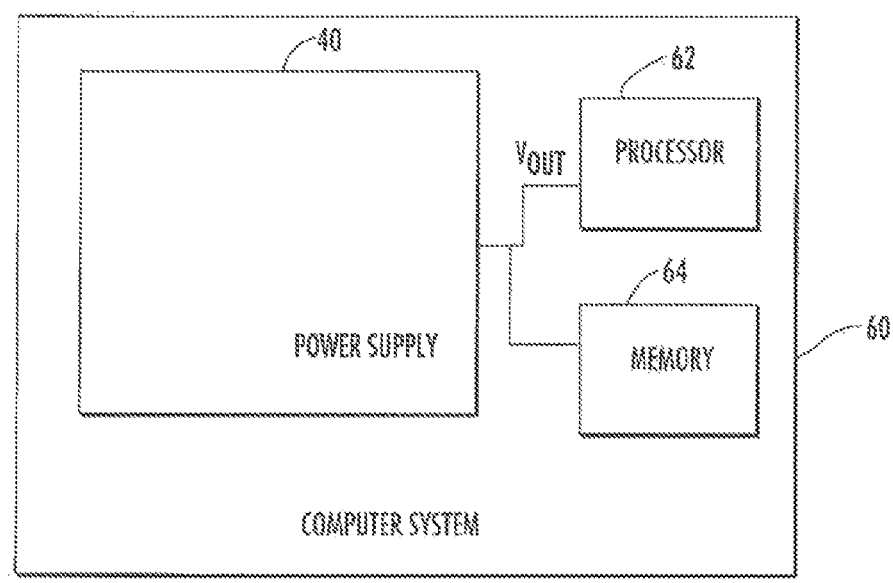
FIG. 8 is a block diagram of an embodiment of a computer system that may incorporate an embodiment of the power supply of FIG. 4, 9, or 10.

FIG. 8 is a block diagram of a computer system 60, which may incorporate the power supply 40 of FIG. 4, or the power supplies of FIGS. 9 and 10 per below, according to an embodiment. But only the power supply 40 is further discussed in conjunction with FIG. 8. The supply 40 may provide the regulated voltage VOUT to a processor 62, a memory 64, or another component (not shown) of the computer system 60. Alternatively, the power supply 40 may be installed in any other type of electronic system.

Figure 9:
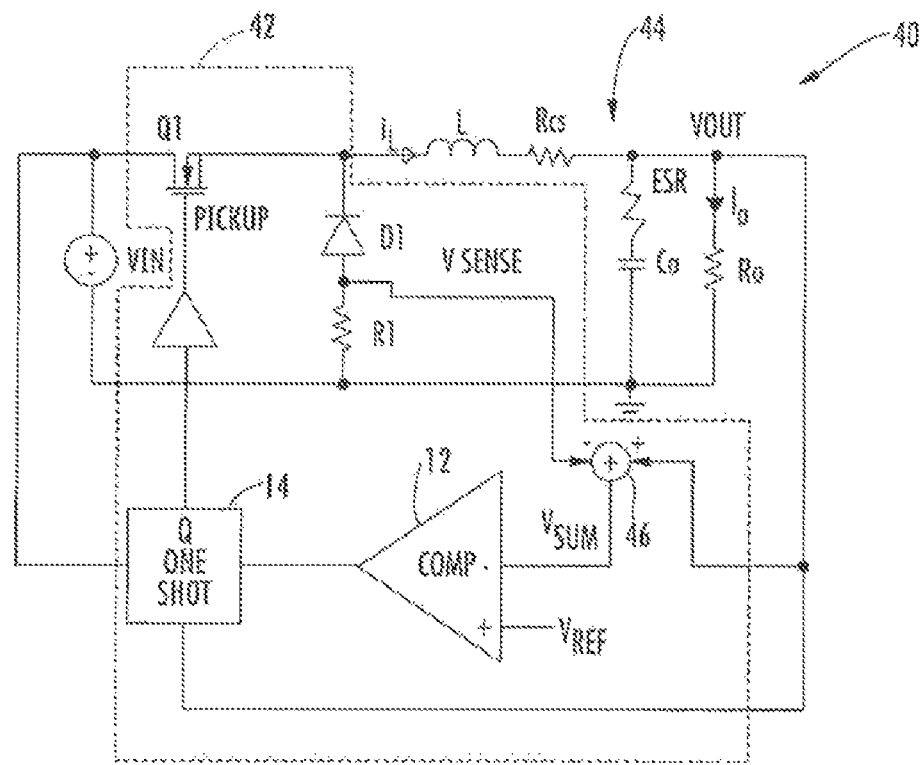
FIG. 9 is a schematic diagram of another embodiment of a constant-on-time power supply.

FIG. 9 is a schematic diagram of an alternate embodiment of the supply 40, where the transistor Q2 is replaced with a diode D1 and a resistor or other resistive element R1. The voltage $V_{sense}$ may be taken across the element R1 as shown, or may be taken across the series combination of R1 and D1.

Figure 10:
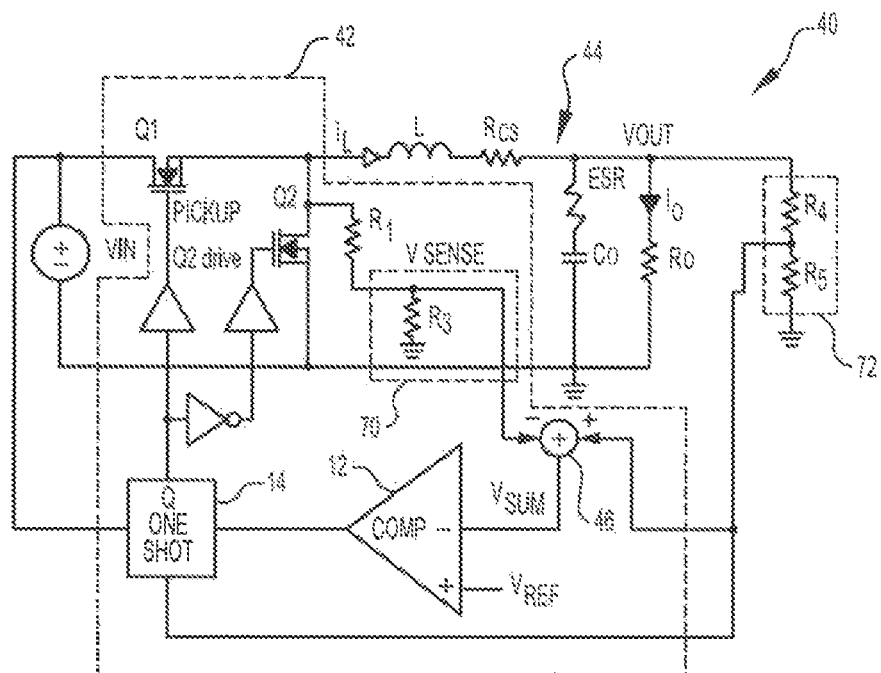
FIG. 10 is a schematic diagram of another embodiment of a constant-on-time power supply.

FIG. 10 is a schematic diagram of another embodiment of the supply 40, where the sense voltage $V_{sense}$ may be a scaled version of the voltage across Q2, and where a scaled version of VOUT may be provided to the noninverting input of the adder 46.

A first scaler 70, for example a resistive voltage divider including resistors R2 and R3, may generate $V_{sense}$ from the voltage across Q2.

A second scaler 72, for example a resistive voltage divider including resistors R4 and R5, may generate a scaled version of VOUT at the noninverting input of the adder 46.

Although described as scaling the voltage across Q2 and VOUT by a respective factors that are less than one, the scalers 70 and 72 may scale the voltage across Q2 and VOUT by respective factors that are greater than or equal to one.

Alternate embodiments of the supply 40 of FIG. 10 are contemplated. For example, the alternate embodiments discussed above in conjunction with FIG. 4 may be applicable to the supply 40 of FIG. 10.

Figure 11:
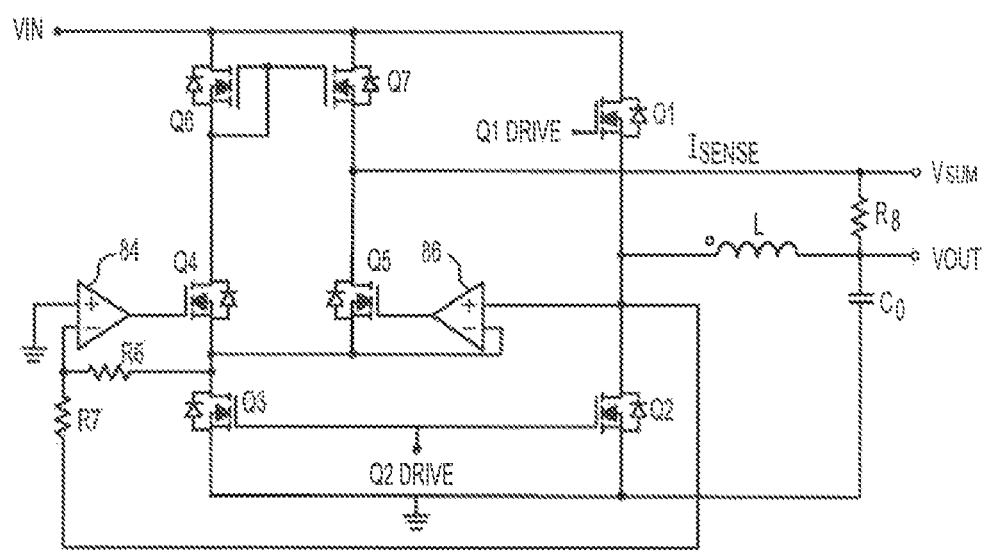
FIG. 11 is a schematic diagram of another embodiment of a temperature-stable circuit that the power supplies of FIGS. 4, 9, and 10 may include to sense the inductor current.

FIG. 11 is a schematic diagram of a sensing circuit 80, a signal combiner 82, and the portion of the power supply 40 of FIGS. 1, 9, and 10 to which the sensing circuit and signal combiner are connected according to an embodiment. Like the sensing circuit 50 of FIG. 7, the sensing circuit 80 may be included in the power supply 40 of FIG. 4, FIG. 9, or FIG. 10 to provide a temperature-stable sense signal, $I_{sense}$ in an embodiment. That is, the circuit 80 reduces the sensitivity of $I_{sense}$ to temperature as compared to $V_{sense}$ being measured directly across Q2 as discussed above in conjunction with FIG. 4. The circuit 80 and combiner 82 may be entirely or partially disposed on the IC 42, or may be totally disposed external to the IC 42. However, where the sensing circuit 80 is disposed entirely on the IC 42, the components of the sensing circuit may be more closely matched to each other; therefore, the sensing circuit may provide $I_{sense}$ with a lower temperature sensitivity than where some or all of the components of the sensing circuit are disposed off chip. Furthermore, the combiner 82 replaces the adder 46 of the power supply 40 of FIG. 4 an this embodiment.

In addition to the transistor Q2, the sensing circuit 80 includes transistors Q3-Q7, a first differential amplifier 84, a second differential amplifier 86, and resistors R6 and R7. The W/L ratio of the transistor Q2 is significantly larger than the W/L ratio of the transistor Q3 such that $I_{sense}/I_{Q2}$ is relatively small, for example $\approx 1/1000$ or lower. Also, the thermal response of Q2 closely matches that of Q3 so that the ratio $I_{sense}/I_{Q2}$ remains substantially constant over a predetermined temperature range for example, an expected operating range of 0°-125° C.; a sufficient matching of the thermal response typically occurs where Q2 and Q3 are disposed in the same region of the same IC. Furthermore, the W/L ratio of the transistor Q6 may be approximately equal to the W/L ratio of Q7 such that the current mirror formed by Q6 and Q7 may have a gain of about unity, and R6 may be approximately equal to R7.

The combiner 82 includes a resistor R8 coupled between the $V_{sum}$ and VOUT nodes.

The operation of the sensing circuit 80 is now described in conjunction with FIGS. 4 and 7 according to an embodiment of the invention, it being understood that the sensing circuit 80 may also be used with the embodiments of the power supply 40 in FIGS. 9 and 10. For purposes of example, the temperature sensitivities of the resistors R6-R8 are ignored, and the gains G1 and G2 of the amplifiers 84 and 86 and the values of the resistors R6 and R7 are selected such that $I_{sense}/I_{Q2} \approx 1/1000$; G1 and G2 are relatively high, for example on the order of 10,000 or more.

When the one shot 14 (FIG. 4) deactivates the transistor Q1 and activates the transistor Q2 during the discharge time $T_{off}$ (FIG. 5B), the one shot also activates the transistor Q3.

Initially, Q2 conducts an inductor-discharge current $I_{Q2}$ that flows from Q2 into the filter inductor L.

Because R6≈R7, the amplifier 84 drives Q4 such that the drain voltage $Vd_{Q3} \approx -Vd_{Q2}$. Consequently, because the gate voltages of Q2 and Q3 are the same, and because the magnitudes of $Vds_{Q2}$ and $Vds_{Q3}$ are substantially equal, the current $I_{Q3}$ through Q3 substantially equals $-I_{Q2}(W/L_{Q3})/(W/L_{Q2})$. And, where Q2 and Q3 are disposed near each other on the same IC or are otherwise thermally matched, this relationship between $I_{Q2}$ and $I_{Q3}$ remains substantially constant over process variations and over an expected operational-temperature range.

The current mirror formed by Q6 and Q7, which has a gain of substantially unity per above, generates $I_{sense} \approx I_{Q3}$.

And $V_{sum} = I_{sense}R8 + VOUT$.

Furthermore, while $I_{Q2}$ is flowing from Q2 to L, the amplifier 86 maintains Q5 in an inactive state.

As discussed above in conjunction with FIG. 4, as $I_{Q2}$ decreases, $I_{sense}$ and $V_{sum}$ also decrease, and the comparator 12 causes the one shot 14 to turn on Q1 and turn off Q2 when $V_{sum}$ is less than $V_{ref}$.

If the load current is higher than half of the peak-to peak inductor current in the power supply 40, $V_{sum}$ becomes less than $V_{ref}$ while the direction of $I_{Q2}$ is still from Q2 to L.

But in a low-power mode of operation, the power supply 40 may allow $I_{Q2}$ to reverse direction, such that $I_{Q2}$ flows from the inductor L to Q2, and may not activate the one shot 14 until the magnitude of this reverse-direction $I_{Q2}$ reaches a threshold.

If $I_{Q2}$ reverses direction, i.e., begins to flow from L to Q2, then the amplifier 84 turns Q4 off, such that Q6 and Q7 are deactivated and no longer generate $I_{sense}$.

But the amplifier 86 activates Q5 such that the drain voltage $Vd_{Q3} \approx Vd_{Q2}$. Consequently, because the gate voltages of Q2 and Q3 are the same, and because $Vds_{Q2}$ and $Vds_{Q3}$ are substantially equal, the current $I_{Q3}$ through Q3 substantially equals $I_{Q2}(W/L_{Q3})/(W/L_{Q2})$. And, where Q2 and Q3 are near each other on the same IC or are otherwise thermally matched, this relationship between $I_{Q2}$ and $I_{Q3}$ remains substantially constant over process variations and an expected operational-temperature range.

Therefore, Q5 generates $I_{sense} = I_{Q3}$.

And $V_{sum} = -I_{sense}R8 + VOUT$.

So, in summary, as $I_{Q2}$ decreases in magnitude as it flows in a forward direction (from Q2 to L), $V_{sum}$ ramps downward toward VOUT. When $I_{Q2}=0$, $V_{sum}=VOUT$. And as $I_{Q2}$ reverses direction and increases in magnitude (e.g., in a low-power mode of operation), $V_{sum}$ continues to ramp downward from VOUT.

Still referring to FIG. 11, alternate embodiments of the sensing circuit 80 are contemplated. For example, R6 may not equal R7, the gain of the current mirror formed by Q6 and Q7 may be other than unity, and the ratio of $I_{Q2}$ to $I_{Q3}$ may be other than approximately 1000. Furthermore, the sensing circuit 80 may be modified to work with a constant-off-time supply, a boost supply, or a buck-boost supply.

Because the input offsets of the amplifiers 84 and 86 may be different, the sensing circuit 80 may cause $V_{sum}$ to have a discontinuity, i.e., a "flat spot," where $I_{sense}$ crosses zero.

Figure 12:
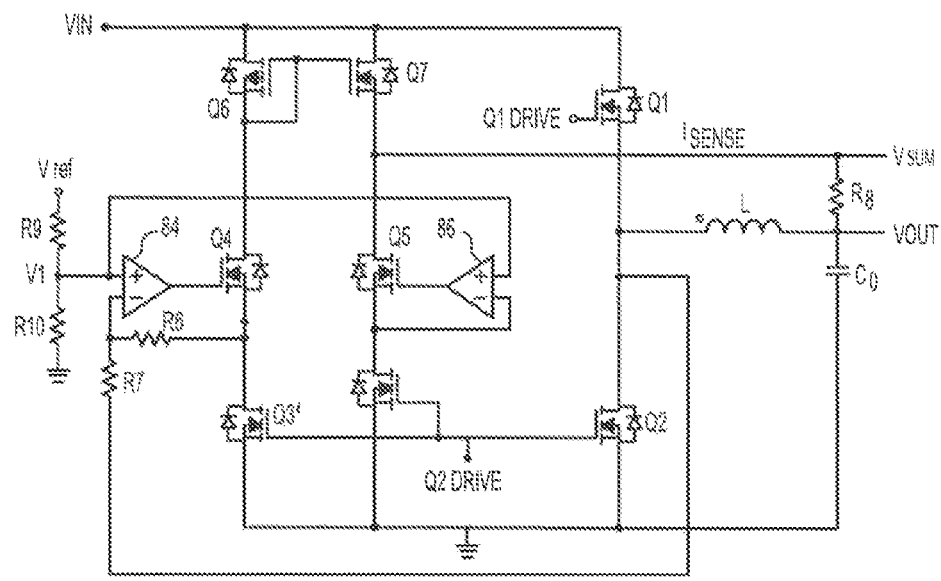
FIG. 12 is a schematic diagram of another embodiment of a temperature-stable circuit that the power supplies of FIGS. 4, 9, and 10 may include to sense the inductor current.

FIG. 12 is a schematic diagram of the signal combiner 82, a sensing circuit 90, and the portion of the power supply of FIGS. 1, 9, and 10 to which the sensing circuit and signal combiner are connected according to an embodiment. The circuit 90 may generate $V_{sum}$ with a shorter discontinuity as compared to the sensing circuit 80 of FIG. 11, or with no discontinuity.

Like the sensing circuits 50 of FIGS. 7 and 80 of FIG. 11, the sensing circuit 90 may be included in the power supply 40 of FIG. 4, FIG. 9, or FIG. 10 to provide a temperature-stable sense signal, $I_{sense}$ in an embodiment. That is, the circuit 90 reduces the sensitivity of $I_{sense}$ to temperature as compared to $V_{sense}$ being measured directly across Q2 as discussed above in conjunction with FIG. 4. The circuit 90 and combiner 82 may be entirely or partially disposed on the IC 42, or may be totally disposed external to the IC 42. However, where the sensing circuit 90 is disposed entirely on the IC 42, the components of the sensing circuit may be more closely matched to each other; therefore, the sensing circuit may provide $I_{sense}$ with a lower temperature sensitivity than where some or all of the components of the sensing circuit are disposed off chip.

The circuit 90 is similar to the circuit 80 of FIG. 11, except that the circuit 90 includes a voltage divider formed by resistors R9 and R10 to generate a voltage V1 (from Vref in an embodiment), and includes a transistor Q3', which may be substantially the same as, and thus substantially tracks with temperature, the transistor Q3. The voltage V1 is selected to have a value greater than the largest positive voltage expected across Q2 when $I_{Q2}$ flows in a reverse direction (i.e., from the inductor L to the transistor Q2) so as to allow the current mirror formed by Q6 and Q7 to remain active over the expected entire range of $I_{Q2}$. Although V1 causes an offset current to flow through Q3, this offset current is effectively cancelled by the current $I_{Q3'}$ through Q3' as discussed below.

The operation of the sensing circuit 90 is now described in conjunction with FIGS. 4 and 12 according to an embodiment, it being understood that the sensing circuit may also be used with the embodiments of the power supply 40 in FIGS. 9 and 10. For purposes of example, the temperature sensitivities of the resistors R6-R8 are ignored, and the gains G1 and G2 of the amplifiers 84 and 86 and the values of the resistors R6 and R7 are selected such that $I_{sense}/I_{Q2} \approx 1/1000$; G1 and G2 are relatively high, for example, on the order of 10,000 or more.

When the one shot 14 (FIG. 4) deactivates the transistor Q1 and activates the transistor Q2 during the discharge time $T_{off}$ (FIG. 5B), the one shot also activates the transistors Q3 and Q3'.

Initially, Q2 conducts an inductor-discharge current $I_{Q2}$ that flows from Q2 into the filter inductor L.

Because R6≈R7, the amplifier 84 drives Q4 such that the drain voltage $Vd_{Q3} \approx -Vd_{Q2} + 2*V1$. Consequently, because the gate voltages of Q2 and Q3 are the same, and because the magnitudes of $Vds_{Q2}$ and $Vds_{Q3}$ are substantially equal but for the offset V1, the current $I_{Q3}$ through Q3 substantially equals $-I_{Q2}(W/L_{Q3})/(W/L_{Q2}) + I_{Q3offset}$, where $I_{Q3offset}$ is equal to $2*V1$ divided by the effective $Rds_{on}$ of Q3. And, where Q2 and Q3 are near each other on the same IC or are otherwise thermally matched, this relationship between $I_{Q2}$ and $I_{Q3}$ remains substantially constant over process variations and over an expected temperature range.

The current mirror formed by Q6 and Q7, which has a gain of substantially unity in this embodiment, generates a current $I_{Q7} \approx I_{Q3} \approx -I_{Q2}(W/L_{Q3})/(W/L_{Q2}) + I_{Q3offset}$.

Furthermore, the amplifier 86 causes a voltage substantially equal to V1 to be across Q3'.

Choosing Q3' substantially twice as wide as Q3, i.e., its Rdson being approximately half of Q3, yields $I_{Q3'} \approx I_{Q3offset} \approx 2*V1/Rdson(Q3)$.

Therefore, $I_{sense} \approx -I_{Q2}(W/L_{Q3})/(W/L_{Q2}) + I_{Q3offset} - I_{Q3offset} \approx -I_{Q2}(W/L_{Q3})/(W/L_{Q2})$.

And $V_{sum} = I_{sense}R8 + VOUT$.

So, in summary, the amplifier 84, MOSFET transistors Q3, Q4, Q6, Q7, and resistors R6, R7, R9, and R10 of the current-sense circuit 90 work for both positive and negative inductor currents flowing through MOSFET Q2 without a crossover discontinuity.

Still referring to FIG. 12, alternate embodiments of the sensing circuit 90 are contemplated. For example, the alternate embodiments discussed above in conjunction with FIGS. 7 and 11 may be applicable to the sensing circuit 90. Furthermore, the amplifier 86 and transistors Q3' and Q5 may be replaced with an appropriately sized resistor between $V_{sum}$ and ground or between Vref and the drain of Q3 to approximately cancel the offset current $I_{Q3offset}$ from $I_{sense}$.

From the foregoing it will be appreciated that, although specific embodiments have been described herein for purposes of illustration, various modifications may be made without deviating from the spirit and scope of the disclosure.

What is claimed is:

1. A switching-power-supply controller comprising:
    a signal combiner operable to generate a combined feedback signal from sense and output feedback signals that are respectively derived from a sense signal and a regulated output signal, the signal combiner operable to receive the sense signal from a sense circuit operable to generate the sense signal relating to a current flowing through an inductor and while a switch that is coupled to the inductor and to a first input voltage source terminal has a first state, the switch operable to generate the regulated output signal; and
    a control circuit coupled to the combiner and operable to cause the switch to have a second state for a predetermined time in response to the combined feedback signal having a predetermined relationship to a reference signal.

2. The power-supply controller of claim 1 wherein:
the sense feedback signal equals the sense signal; and
the output feedback signal equals the regulated output signal.

3. The power-supply controller of claim 1 wherein:
the sense feedback signal equals a scaled version of the sense signal; and
the output feedback signal equals a scaled version of the regulated output signal.

4. The power-supply controller of claim 1 wherein:
the sense signal comprises a sense voltage; and
the regulated output signal comprises a regulated output voltage.

5. The power-supply controller of claim 1 wherein the signal combiner comprises an adder.

6. The power-supply controller of claim 1 wherein:
the signal combiner comprises an adder; and
the adder is operable to invert the sense feedback signal and to generate the combined feedback signal equal to a sum of the inverted sense feedback signal and the output feedback signal.

7. The power-supply controller of claim 1 wherein:
the first state of the switch comprises an electrically closed state; and
the second state of the switch comprises an electrically open state.

8. The power-supply controller of claim 1 wherein:
the first state of the switch comprises an electrically open state; and
the second state of the switch comprises an electrically closed state.

9. The power-supply controller of claim 1 wherein the control circuit is operable to cause the switch to have the second state in response to the first feedback signal being less than the reference signal.

10. The power-supply controller of claim 1 wherein the control circuit is operable to cause the coupler to have the second state in response to the first feedback signal being greater than the reference signal.

11. The power-supply controller of claim 1, further comprising:
wherein the sense circuit includes a synchronous rectifier transistor that is operable to be coupled to the control circuit and to the regulated output signal, and that is operable to conduct the current flowing through the inductor;
wherein the switch comprises a drive transistor; and
wherein the control circuit is operable to cause the drive transistor to have the second state for the predetermined time in response to the first feedback signal having the predetermined relationship to the reference signal.

12. The power-supply controller of claim 1, further comprising:
wherein the sense circuit includes a synchronous rectifier transistor that is operable to be coupled to the control circuit and to the regulated output signal, and that is operable to conduct the current flowing through the inductor;
wherein the switch comprises a drive transistor; and
wherein the control circuit is operable to cause the drive transistor to have the second state for the predetermined time in response to the first feedback signal having the predetermined relationship to the reference signal.

13. The power-supply controller of claim 1, further comprising:
at least a portion of the sense circuit; and
wherein the sense circuit is operable to generate a sense current that is proportional to the current flowing through the inductor, and to generate the sense signal from the sense current.

14. The power-supply controller of claim 1, further comprising:
at least a portion of the sense circuit; and
wherein the sense circuit is operable to generate a sense current that is proportional to the current flowing through the inductor by a factor that is substantially constant over a temperature range, and is operable to generate the sense signal from the sense current.

15. The power-supply controller of claim 1 wherein the control circuit comprises a comparator operable to transition a comparison signal in response to the combined feedback signal having the predetermined relationship to the reference signal, the control circuit operable to cause the switch to have the second state in response to the transition of the comparison signal.

16. A power-supply, comprising:
first and second input-voltage nodes;
an output node operable to carry a regulated output signal;
an inductor having a first node and having a second node coupled to the output node;
a first transistor coupled between the first node of the inductor and the first input-voltage node;
a sense circuit coupled to the second input-voltage node and to the first node of the inductor and operable to generate a sense signal that is related to a current flowing through the inductor while the first transistor is in a first state;
a signal generator operable to generate a feedback signal that is related to the sense signal and the regulated output signal; and
a control circuit operable to cause the first transistor to have a second state for a predetermined time in response to the feedback signal having a predetermined relationship to a first reference signal.

17. The power supply of claim 16 wherein:
the first state comprises an off state;
the sense circuit comprises a resistive element serially coupled between the first node of the inductor and the second input node and operable to conduct the current that flows through the inductor while the first transistor is in the first state; and
wherein the sense circuit is operable to generate the sense signal from a voltage across the resistive element while the current flows through the resistive element.

18. The power supply of claim 16 wherein:
the sense circuit comprises a resistive element and a diode serially coupled between the first node of the inductor and the second input node and operable to conduct the current that flows through the inductor while the first transistor is in an off state; and
wherein the sense circuit is operable to generate the sense signal from a voltage across the resistive element while the current flows through the resistive element.

19. The power supply of claim 16 wherein:
the first state comprises an off state;
the second state comprises an on state;
the sense circuit comprises a second transistor serially coupled between the first node of the inductor and the second input node and operable to conduct the current that flows through the inductor while the first transistor is in the first state, the sense circuit being operable to generate the sense signal from a voltage across the second transistor while the current flows through the second transistor; and the control circuit is operable to cause the first transistor to have the first state and to cause the second transistor to have the second state after the predetermined time elapses.

20. The power supply of claim 16 wherein:
the first state comprises an off state;
the second state comprises an on state;
the sense circuit comprises,
   a second transistor serially coupled between the first node of the inductor and the second input node and operable to conduct the current that flows through the inductor while the first transistor is in the first state, the second transistor having a control node coupled to the control circuit,
   a third transistor having a first path node coupled to the second input node, having a second path node, and having a control node coupled to the control node of the second transistor,
   a fourth transistor having a first path node coupled to the second path node of the third transistor, having a second path node, and having a control node,
   a first amplifier having a first input node coupled to the first node of the inductor and to the second path node of the third transistor, a second input node operable to receive a second reference signal, and an output node coupled to the control node of the fourth transistor, and
   a current mirror having an input node coupled to the second path node of the fourth transistor and having an output node operable to carry the sense signal; and
the control circuit is operable to cause the first transistor to have the first state and to cause the second and third transistors to have the second state after the predetermined time elapses.

21. The power supply of claim 16 wherein:
the first state comprises an off state;
the second state comprises an on state;
the sense circuit comprises,
   a second transistor serially coupled between the first node of the inductor and the second input node and operable to conduct the current that flows through the inductor while the first transistor is in the first state, the second transistor having a control node coupled to the control circuit and having a current gain,
   a third transistor having a first path node coupled to the second input node, having a second path node, having a control node coupled to the control node of the second transistor, and having a current gain that is less than the current gain of the second transistor,
   a fourth transistor having a first path node coupled to the second path node of the third transistor, having a second path node, and having a control node,
   a first amplifier having a first input node coupled to the first node of the inductor and to the second path node of the third transistor, a second input node operable to receive a second reference signal, and an output node coupled to the control node of the fourth transistor, and
   a current mirror having an input node coupled to the second path node of the fourth transistor and having an output node operable to carry the sense signal; and the control circuit is operable to cause the first transistor to have the first state and the second and third transistors to have the second state after the predetermined time elapses.

22. The power supply of claim 16 wherein:
the first state comprises an off state;
the second state comprises an on state;
the sense circuit comprises,
   a second transistor serially coupled between the first node of the inductor and the second input node and operable to conduct the current that flows through the inductor while the first transistor is in the first state, the second transistor having a control node coupled to the control circuit,
   a third transistor having a first path node coupled to the second input node, having a second path node, and having a control node coupled to the control node of the second transistor,
   a fourth transistor having a first path node coupled to the second path node of the third transistor, having a second path node, and having a control node,
   a first amplifier having a first input node coupled to the first node of the inductor and to the second path node of the third transistor, a second input node operable to receive a second reference signal, and an output node coupled to the control node of the fourth transistor,
   a current mirror having an input node coupled to the second path node of the fourth transistor and having an output node operable to carry the sense signal,
   a fifth transistor having a first path node coupled to the second path node of the third transistor, having a second path node coupled to the output node of the current mirror, and a control node, and
   a second amplifier having a first input node coupled to the first node of the inductor, a second input node coupled to the first path node of the fifth transistor, and an output node coupled to the control node of the fifth transistor; and
the control circuit is operable to cause the first transistor to have the first state and the second and third transistors to have the second state after the predetermined time elapses.

23. The power supply of claim 16 wherein:
the first state comprises an on state;
the second state comprises an off state;
the sense circuit comprises,
   a second transistor serially coupled between the first node of the inductor and the second input node and operable to conduct the current that flows through the inductor while the first transistor is in the first state, the second transistor having a control node coupled to the control circuit,
   a third transistor having a first path node coupled to the second input node, having a second path node, and having a control node coupled to the control node of the second transistor,
   a fourth transistor having a first path node coupled to the second path node of the third transistor, having a second path node, and having a control node,
   a first amplifier having a first input node coupled to the first node of the inductor and to the second path node of the third transistor, a second input node operable to receive a second reference signal, and an output node coupled to the control node of the fourth transistor, the first amplifier operable to cause the fourth to conduct current only when the current is flowing through the filter inductor in a first direction, a current mirror having an input node coupled to the second path node of the fourth transistor and having an output node operable to carry the sense signal, a fifth transistor having a first path node coupled to the second path node of the third transistor, having a second path node coupled to the output node of the current mirror, and a control node, and a second amplifier having a first input node coupled to the first node of the inductor, a second input node coupled to the first path node of the fifth transistor, and an output node coupled to the control node of the fifth transistor, the second amplifier operable to cause the fifth transistor to conduct current only when the current is flowing through the filter inductor in a second direction; and the control circuit is operable to cause the first transistor to have the first state and the second and third transistors to have the second state after the predetermined time elapses.

24. The power supply of claim 16 wherein:
the first state comprises an off state;
the second state comprises an on state;
the sense circuit comprises,
a second transistor serially coupled between the first node of the inductor and the second input node and operable to conduct the current that flows through the inductor while the first transistor is in the first state, the second transistor having a control node coupled to the control circuit, a third transistor having a first path node coupled to the second input node, having a second path node, and having a control node coupled to the control node of the second transistor, a fourth transistor having a first path node coupled to the second path node of the third transistor, having a second path node, and having a control node, a first amplifier having a first input node coupled to the first node of the inductor and to the second path node of the third transistor, a second input node operable to receive a second reference signal, and an output node coupled to the control node of the fourth transistor, a current mirror having an input node coupled to the second path node of the fourth transistor and having an output node operable to carry the sense signal, a sixth transistor having a first path node coupled to the second input node, having a second path node, and having a control node coupled to the control node of the second transistor, a fifth transistor having a first path node coupled to the second path node of the sixth transistor, having a second path node coupled to the output node of the current mirror, and having a control node, a second amplifier having a first input node operable to receive the second reference signal, a second input node coupled to the second path node of the sixth transistor, and an output node coupled to the control node of the fifth transistor; and the control circuit is operable to cause the first transistor to have the first state and to cause the second, third, and fourth transistors to have the second state after the predetermined time elapses.

25. The power supply of claim 16 wherein the signal generator comprises an adder that is operable to invert a signal related to the sense signal and to generate the feedback signal equal to a sum of the inverted signal and a signal related to the regulated output signal.

26. The power supply of claim 16 wherein the signal generator comprises an impedance element having a first node operable to receive a signal related to the sense signal, having a second node operable to receive a signal related to the regulated output signal, and operable to provide the feedback signal on the first node of the impedance element.

27. The power supply of claim 16, further comprising:
a comparator operable to transition a comparison signal in response to the feedback signal being less than the reference signal; and
wherein the control circuit is operable to cause the first transistor to have the second state in response to the transition of the comparison signal.

28. The power supply of claim 16, further comprising:
a comparator operable to transition a comparison signal in response to the feedback signal being greater than the reference signal; and
wherein the control circuit is operable to cause the first transistor to have the first state in response to the transition of the comparison signal.

29. An electronic system, comprising:
a power-supply, comprising,
a first input node operable to receive a first input voltage,
an output node operable to carry a regulated output signal,
a second input node operable to receive a second input voltage,
an inductor having a first node and having a second node coupled to the output node,
a first transistor coupled between the first node of the filter inductor and the first input node,
a sense circuit coupled to the first node of the inductor and operable to generate a sense signal that is related to a current flowing through the inductor while the first transistor has a first state,
a signal combiner operable to generate a feedback signal from the sense and regulated output signals, and
a control circuit coupled to the combiner and operable to cause the first transistor to have a second state for a predetermined time in response to the combined feedback signal having a predetermined relationship to a reference signal; and
a load coupled to the output node of the power supply.

30. The system of claim 29 wherein the load is comprises an integrated circuit.

31. The system of claim 29 wherein:
the load is disposed on an integrated circuit; and
at least one component of the power supply is disposed on the integrated circuit.

32. A method, comprising:
causing a first-type current to flow through a switching-power-supply inductor that is coupled to a regulated output signal;
generating a sense signal that is related to the first-type current with a sense circuit having at least a portion through which the first-type current flows;
generating a feedback signal from the sense signal and the regulated output signal; and
causing a second-type current to flow through the inductor for a predetermined time in response to the feedback signal having a predetermined relationship to a reference signal.

33. The method of claim 32 wherein:
the first-type current comprises a charging current; and
the second-type current comprises a discharging current.

34. The method of claim 32 wherein:
the first-type current comprises a discharging current; and
the second-type current comprises a charging current.

35. The method of claim 32 wherein:
the first-type current comprises a discharging current; and
generating the sense signal comprises generating a sense voltage equal to a voltage across a current-return component through which the first-type current flows.

36. The method of claim 32, further comprising reducing a magnitude of a temperature coefficient of the sense signal.

37. The method of claim 32 wherein generating the feedback signal comprises:
inverting the sense signal; and
generating the feedback signal equal to the sum of the inverted sense signal and the regulated output signal.

38. The method of claim 32 wherein generating the feedback signal comprises:
inverting a scaled version of the sense signal; and
generating the feedback signal equal to the sum of the inverted scaled version of the sense signal and a scaled version of the regulated output signal.

39. The method of claim 32 wherein generating the sense signal comprises:
generating a sense current that is proportional to the first-type current flowing through the inductor; and
generating the sense signal equal to the sense current.

40. The method of claim 32 wherein generating the sense signal comprises:
generating a sense current that is proportional to and less than the first-type current flowing through the inductor; and
generating the sense signal equal to the sense current.

41. The method of claim 32 wherein generating the sense signal comprises:
generating a sense current substantially equal to a product of a scale factor and a sum of a current proportional to the first-type current flowing through the inductor and an offset current; and
generating the sense signal substantially equal to the difference between the product of the scale factor and the sense current and the product of the scale factor and the offset current.

42. A method for sensing switch current through a switching transistor of a switching voltage regulator, the method comprising:
generating a first pilot current through a first pilot transistor that substantially matches at least one characteristic of the switching transistor;
monitoring a voltage drop across the switching transistor;
controlling the first pilot current to maintain a voltage drop across the pilot transistor at a predetermined scaled negative multiple of the voltage drop across the switching transistor while the switch current has a first polarity;
generating a second pilot current through the pilot transistor;
controlling the second pilot current through the pilot transistor to maintain the voltage drop across the pilot transistor at a predetermined scaled positive multiple of the voltage drop across the switching transistor while the switch current has a second polarity; and
combining and scaling the first and second pilot currents to provide a current-sense signal corresponding the switch current.

43. The method of claim 42 wherein the multiple is one.

44. The method of claim 42 wherein the switching transistor and the pilot transistor are n-channel MOSFET transistors and the first polarity of switch current results in a negative drain-to-source voltage drop across the switching transistor.

45. The method of claim 42 where the switching transistor and the pilot transistor are p-channel MOSFET transistors and the first polarity of switch current results in a positive drain-to-source voltage drop across the switching transistor.

46. A method for sensing switch current through a switching transistor of a switching voltage regulator, the method comprising:
monitoring a voltage drop across the switching transistor;
generating a pilot current through a first pilot transistor that matches at least one characteristic of the switching transistor;
controlling the pilot current through the first pilot transistor to maintain a voltage drop across the pilot transistor at an offset voltage plus a predetermined scaled negative multiple of the voltage drop across the switching transistor;
generating an offset-compensation current through a second pilot transistor that matches at least one characteristic of the switching transistor, the offset-compensation current corresponding to the offset voltage; and
subtracting the offset-compensation current from the pilot current and scaling a resulting current to generate a current-sense signal corresponding the switch current.

47. The method of claim 46 where the multiple is one.

48. The method of claim 46 where the said switching transistor and said pilot transistors are MOSFET transistors.

49. The method of claim 48 wherein the offset-compensation current is generated by a resistor between a reference voltage and a drain of the first pilot transistor.

50. The method of claim 46 wherein:
the current-sense signal is provided to a first terminal of a first resistor, the second terminal of the first resistor being connected to a low-impedance voltage node; and
the offset-compensation current is generated via a second resistor between the first terminal of the first resistor and a reference node.

* * * * *